Oct. 24, 1933.    J. A. CAMERON    1,931,788
INTERNAL COMBUSTION ENGINE
Filed March 26, 1931    3 Sheets-Sheet 1

INVENTOR.
JOHN A. CAMERON.
BY *Fetherstonhaugh & Co.*
ATT'YS.

Oct. 24, 1933.   J. A. CAMERON   1,931,788
INTERNAL COMBUSTION ENGINE
Filed March 26, 1931   3 Sheets-Sheet 3

INVENTOR.
JOHN A. CAMERON.
ATT'YS.

Patented Oct. 24, 1933

1,931,788

UNITED STATES PATENT OFFICE 1,931,788

INTERNAL COMBUSTION ENGINE

John Angus Cameron, Madawaska, Ontario, Canada

Application March 26, 1931. Serial No. 525,427

9 Claims. (Cl. 123—75)

This invention relates to improvements in internal combustion engines and more particularly to improvements in the arrangement of the sleeve valve mechanism therefor.

In internal combustion engines controlled through sleeve valves it has been found that while these valves operate with great efficiency, after the engine has been in operation for some little time due to the fact that it is very difficult to properly cool the sleeves, they become very hot and naturally affect the efficiency of operation of the engine. In structures of this type the sleeve valves are positioned within the cylinder, the piston operating within the inner sleeve valve, and the only means of cooling the sleeve is through the cylinder block. It is quite apparent, therefore, that this cooling operation will not be very efficient since the cooling action must penetrate three thicknesses of metal, i.e. the wall of the cylinder block, the outer sleeve valve, and the inner sleeve valve. It is therefore a natural result that the sleeves will get extremely hot and decrease the efficiency of the operation of the engine and unequal expansion will therefore result.

It is therefore an object of the present invention to so relate the cylinder sleeve valves to eliminate overheating and to also reduce the area of the sleeve valves and correspondingly reduce at the same time the consumption of oil in the lubrication of these parts.

It is a further object of the invention to reduce the amount of material used in the construction of these sleeve valves through a corresponding reduction in the area of the valves.

A further object of the invention is to particularly provide for an even cooling of the inner and outer sleeves of each cylinder to obviate unequal expansion.

A further object of the invention is to provide a removable cylinder which may be separately constructed and finished in any desirable manner or suitable material, With these and other objects in view the invention consists essentially in the formation of a removable cylinder housing adapted to be removably positioned within the cylinder block and around which operate the sliding sleeve valves mounted one above the other, the outer sleeve being cooled through the water system of the cylinder block and the inner sleeve being cooled through a water chamber formed in the walls of the removable cylinder housing and in communication with the water system of the cylinder block, as more fully described in the following specification and illustrated in the accompanying drawings which form part of the same.

In the drawings, Figure 1 is a transverse sectional elevation taken through the cylinder block of an internal combustion engine, illustrating the formation of the cylinder and the arrangement of the sleeve valves according to the present invention.

Referring more particularly to the drawings A indicates the cylinder block formed with the usual intake and exhaust ports 10 and 11 and provided with the usual water jacket 12. Within the cylinder block the cylinder housing B is positioned which, according to the present invention, is removable and is designed to be inserted within the block and firmly seated therein.

Figure 1:
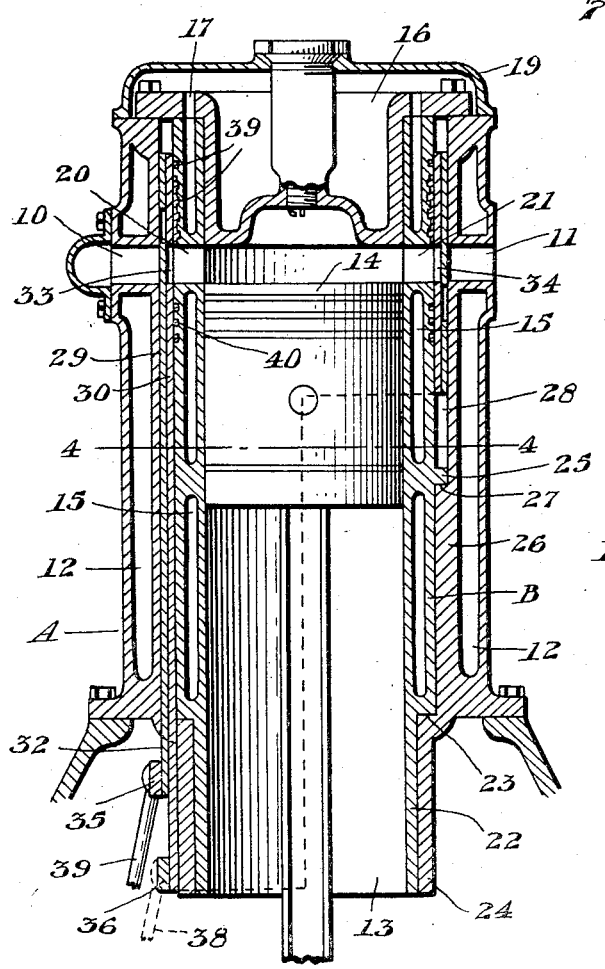
Figure 4:
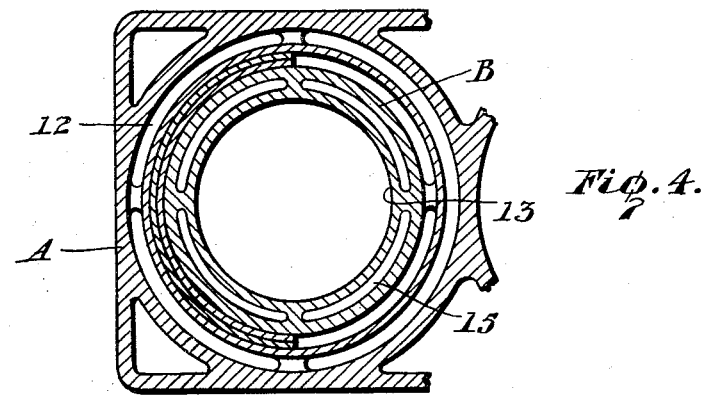
Figure 4 is a section on the line 4—4 of Figure 1.
Figure 3:
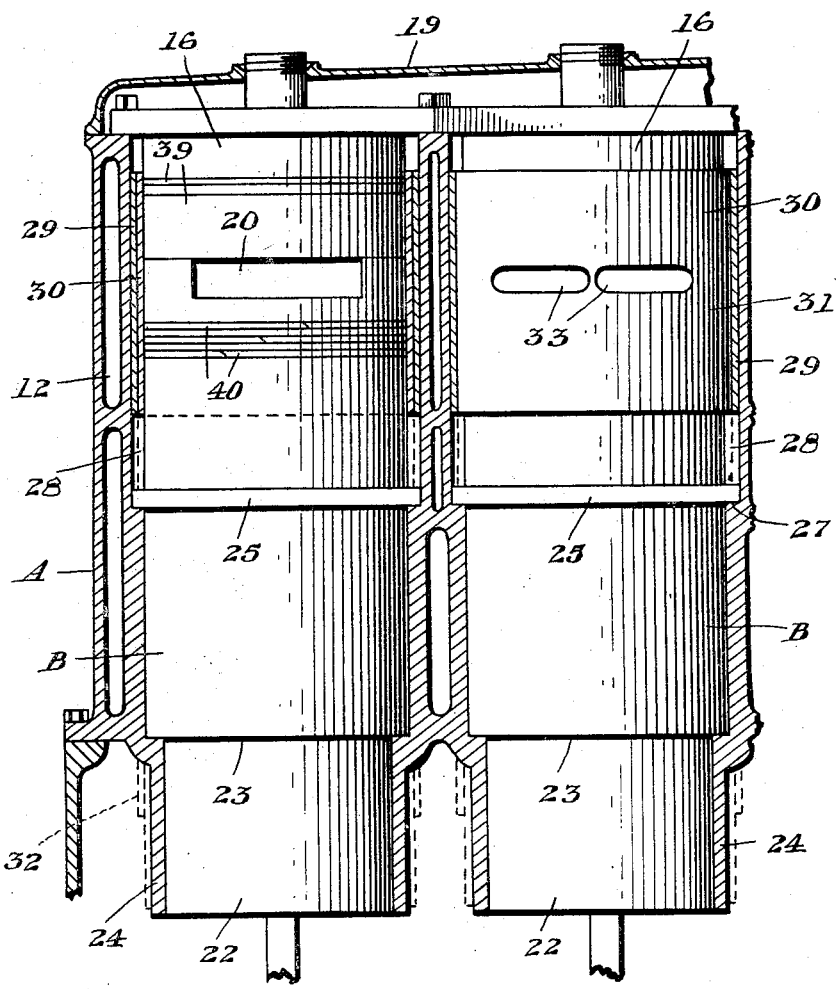
Figure 3 is a longitudinal sectional elevation of the cylinder block of an internal combustion engine taken through two of the cylinders, illustrating in one cylinder the sleeve valves in section with the cylinder in elevation and in the other cylinder one sleeve valve in section and the other in elevation.
Figure 6:
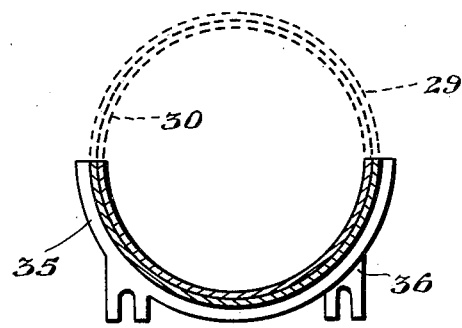
Figure 6 is a section taken through the extensions of the sleeve valves when mounted in normal position.
Figure 5:
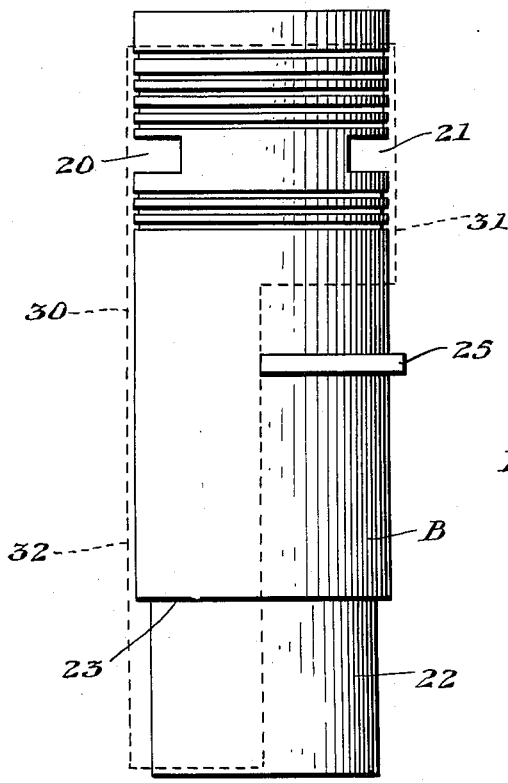
Figure 5 is an elevation of one of the removable cylinder housings illustrating the position of the inner sleeve valve in dotted lines and also illustrating the shoulders formed upon the cylinder housing.

The cylinder housing B is of cylindrical form and is provided with the usual cylinder bore 13 within which the piston 14 is adapted to reciprocate and is also provided with a water jacket 15 which surrounds the cylinder housing in a similar manner to the water jacket 12 of the cylinder block A. Within the top of the cylinder is mounted the cylinder head 16 which is provided with channels 17 placing the water jacket 15 of the cylinder housing B in communication with the water jacket 12 or water system of the cylinder block A so that the cylinder housing B is constantly supplied with a cooling medium. The top of the engine, as illustrated in Figure 1, is covered in the usual manner by the head or cap 19. Within the cylinder housing B, intake and exhaust ports 20 and 21 are provided which are designed to register with the intake and exhaust ports 10 and 11 in the cylinder block A with which ports the sleeve valves are adapted to co-operate, as will be hereinafter described.

The cylinder housing B, which is cylindrical in cross-section, is formed with the cylindrical extension 22 which is of less diameter than the external diameter of the main body of the cylinder housing, providing therebetween the downwardly directed shoulder 23. The extension 22 is adapted to fit within the skirt 24 of the cylinder block and the downwardly directed shoulder 23 is adapted to rest upon a corresponding upwardly directed shoulder formed between the cylinder block and the skirt 24 so as to firmly seat the cylinder housing B within the cylinder block A. Intermediate of its length the cylinder housing B is provided with a protruding shoulder or rib 25 which extends substantially half way around the exterior wall of the cylinder housing, or in other words is substantially semi-circular.

Figure 2:
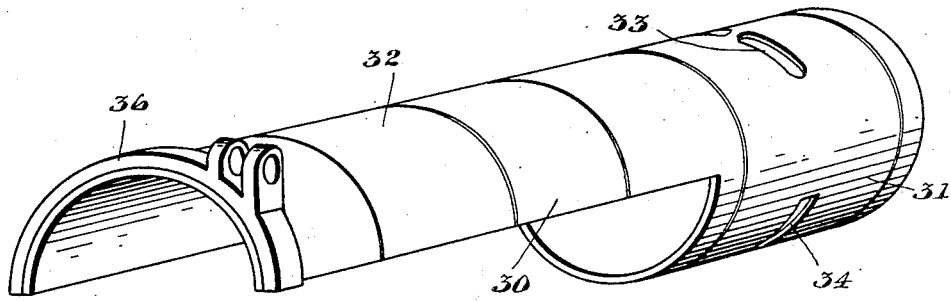
Figure 2 is a perspective view of one of the sleeve valves.

The internal walls of the cylinder block A within which fits the cylinder housing B are in an area corresponding with the area of the shoulder or rib 25 formed with a thickened wall portion 26 which terminates intermediately of the block in the upwardly directed shoulder 27 so that the rib 25, as clearly illustrated in Figure 1, firmly sits upon the shoulder 27. Between the cylinder housing B and the cylinder block A by virtue of the thickened portion 26 of the block a spaced enclosure 28 is provided which is designed to house the outer and inner sleeve valves 29 and 30. These sleeve valves 29 and 30 are of a form particularly illustrated in Figure 2 having a cylindrical body portion 31, a portion of the bottom of which has been cut away so as to form the extension 32. In the cylindrical portion of the sleeve valves, intake and exhaust ports 33 and 34 are provided which are designed to register under normal operating conditions with the intake and exhaust ports of the cylinder housing B and cylinder block A, the sleeve valves being mounted and operating between these two members of the engine in each unit thereof.

As particularly illustrated in Figure 1 the sleeve valves 29 and 30 are designed so as to slide one upon the other in the normal manner, the extension 32 of the outer sleeve being positioned directly outside or above the extension for the inner sleeve valve, but in the present case these sleeve valves are mounted around the cylinder housing B in the enclosure 28, the extensions 32 extending downwardly from the cylinder block A and outside of the skirt 24 thereof.

On the lower ends of the inner and outer sleeve valves any suitable connecting brackets 35 and 36 are detachably provided to which brackets are operatively attached, in any suitable well known manner, connecting rods 37 and 38 which are operated in any well known manner such for instance as by an eccentric in turn operated from the drive mechanism. Consequently upon operation of such eccentric the sleeve valves 29 and 30 will be reciprocated in normal manner to cause the intake and exhaust ports 33 and 34 thereof to automatically register in correct timing with the corresponding ports in the cylinder housing B and cylinder block A so as to control the operation of the engine.

In order to ensure a gas-tight connection the upper exterior portions of the cylinder housing B are provided with the usual sealing rings 39 and 40.

It will be apparent in the foregoing that, in brief, the construction consists in an engine block formed with a cylinder therein within which fits a removable cylindrical cylinder housing with sleeve valves operating between the engine block cylinder and the removable cylinder housing. The removable cylinder housing is, of course, formed concentric with the cylinder of the engine block. In the use of the term "cylinder housing" throughout the specification and claims, it is intended that this term be interpreted as designating a removable jacketed cylinder.

According to the present construction it will be seen that the sleeve valve mechanism will operate in exactly the same manner as it operates in the general structure previously referred to but the decided advantage obtained in the present invention of a cooling jacket on each side of the sleeve valve so that each sleeve valve is directly cooled in the present case in contradisdinction to the indirect cooling of the known arrangement of these valves. In addition to this the cylinder housing B may be entirely removed from the block A if it is desired. The cylinder housing B and of course the cylindrical bore 13 thereof may be formed of special material, such as chilled cast steel, and machined to tightly fit within the cylinder block A.

A further advantage which is derived in the present structure is in the formation of the sleeve valves in which much less material is used and consequently a considerable reduction in oil consumption effected. Of course the lubrication of the sleeve valves is effected in a similar manner to structures of this type at present in use.

An important feature of the present invention is that the cylinder housing B and the sleeve valves are adapted to be inserted into and removed from the cylinder block A through the open upper end thereof after the simple removal of the cylinder head, thus enabling convenient assembly of and access to both the sleeves and cylinder housing, without dismantling the base part of the engine or disturbing the cylinder block. In order to permit removal of the sleeves it is only necessary to detach the brackets 35 and 36 from the sleeves after which these sleeves may be freely withdrawn upwardly through the open top of the cylinder block.

Various modifications may be made in this invention without departing from the spirit thereof or the scope of the claims and therefore the exact forms shown are to be taken as illustrative only and not in a limiting sense, and it is desired that only such limitations shall be placed thereon as are disclosed in the prior art or are set forth in the accompanying claims.

What I claim as my invention is:—

1. In an internal combustion engine formed with a plurality of cylinders, sleeve valves designed to cooperate therewith including a cylindrical portion formed with ports therein and a substantially semi-cylindrical extension adapted to carry an operating connection.

2. Improvements in internal combustion engines comprising an engine block, a plurality of removable cylinders housed within said block, a pair of sleeve valves slidably mounted around the exterior of said cylinders, said valves including a cylindrical portion and an integral substantially semi-cylindrical extension designed to protect from said block, ports in said cylindrical portion adapted to register with ports in said cylinders and block during operation, means on said extension for carrying an operating connection and means for cooling each sleeve valve from opposite sides.

3. In an internal combustion engine, the combination with the cylinder block thereof open at its upper end and a removable cylinder head for said open upper end, of a plurality of concentric cylindrical sleeve valve members adapted for insertion into and removal from the cylinder block through the open upper end thereof, each of said sleeve valve members comprising an upper complete cylinder and a lower segmental cylindrical portion depending therefrom.

4. In an internal combustion engine, the combination with the cylinder block thereof open at its upper end and a removable cylinder head for said open upper end, of a plurality of concentric cylindrical sleeve valve members adapted for insertion into and removal from the cylinder block through the open upper end thereof, each of said sleeve valve members comprising an upper complete cylinder and a lower segmental cylindrical portion depending therefrom, a bracket removably secured to the lower end of each of said segmental cylindrical portion, and a connecting rod connected to each bracket.

5. In an internal combustion engine, the combination with the cylinder block thereof open at its upper end and a removable cylinder head for said open upper end, of a plurality of concentric cylindrical sleeve valve members adapted for insertion into and removal from the cylinder block through the open upper end thereof, each of said sleeve valve members comprising an upper ported complete cylinder and a lower segmental cylindrical portion depending therefrom, the upper complete cylinders and the lower segmental cylindrical portions overlying each other respectively, a bracket removably secured to the lower end of each of said segmental cylindrical portions, and a connecting rod connected to each bracket.

6. In an internal combustion engine, the combination with the cylinder block thereof open at its upper end and a removable cylinder head for said open upper end, of a cylindrical water-jacketed cylinder housing, and a plurality of cylindrical sleeve valve members concentrically mounted exteriorly thereabout, the cylinder housing and the sleeve valve members adapted for insertion into and removal from the cylinder block through the open upper end thereof, each of said sleeve valve members comprising an upper complete cylinder and a lower segmental cylindrical portion depending therefrom, a bracket removably secured to the lower end of each of said segmental cylindrical portions, and a connecting rod connected to each bracket.

7. In an internal combustion engine, the combination with the cylinder block thereof open at its upper end and a removable cylinder head for said open upper end, of a cylindrical water-jacketed cylinder housing, and a plurality of cylindrical sleeve valve members concentrically mounted exteriorly thereabout, the cylinder housing and the sleeve valve members adapted for insertion into and removal from the cylinder block through the open upper end thereof, each of said sleeve valve members comprising an upper ported complete cylinder and a lower segmental cylindrical portion depending therefrom, the upper complete cylinders and the lower segmental cylindrical portions overlying each other respectively, a bracket removably secured to the lower end of each of segmental cylindrical portions, and a connecting rod connected to each bracket.

8. A sleeve valve member for an internal combustion engine comprising a complete cylindrical portion at one end thereof, a segmental cylindrical portion extending therefrom, and a bracket removably secured to the end of the segmental portion remote from the complete cylindrical portion.

9. Sleeve valve mechanism for internal combustion engines comprising a pair of concentrically disposed cylindrical ported sleeves consisting of an outer sleeve slidably encircling an inner sleeve, each sleeve formed with a segmental cylindrical portion extending threfrom, the segmental portion of the inner sleeve underlying that of the outer portion and projecting therebeyond, a bracket removably secured to the free end of each segmental portion, and a connecting rod secured to each of said brackets.

JOHN ANGUS CAMERON.